United States Patent [19]
Schulte-Elte et al.

[11] 3,957,877
[45] May 18, 1976

[54] BUTENOYL-CYCLOHEXANONES

[75] Inventors: Karl-Heinrich Schulte-Elte; Henri Jindra, both of Geneva, Switzerland

[73] Assignee: Firmenich S.A., Geneva, Switzerland

[22] Filed: Mar. 20, 1975

[21] Appl. No.: 560,225

Related U.S. Application Data

[62] Division of Ser. No. 408,919, Oct. 23, 1973.

[30] Foreign Application Priority Data

Mar. 21, 1973 Switzerland ........................ 4096/73
Oct. 26, 1972 Switzerland ........................ 15691/72

[52] U.S. Cl. ............................ 260/586 R; 252/522
[51] Int. Cl.[2] .................. C07C 49/30; C07C 49/26; C07C 49/44
[58] Field of Search ............................ 260/586 R

[56] References Cited

UNITED STATES PATENTS

| | | | |
|---|---|---|---|
| 3,793,375 | 2/1974 | Schwieter | 260/586 R |
| 3,822,315 | 7/1974 | Klein | 260/586 R |
| 3,875,241 | 4/1975 | Corbier et al. | 260/586 R |

OTHER PUBLICATIONS

Beilstein, "Hand. der Org. Chem.," Vol. VII No. 4, pp. 3338–3339 (1949).

Maldonado, Chem. Abst., Vol. 78 p. 15437g (1973), article pub. 1972 at "Rev. Soc. Quim MEX," 1972, 16(5) 200–201.

*Primary Examiner*—Norman Morgenstern
*Attorney, Agent, or Firm*—Pennie & Edmonds

[57] ABSTRACT

Use of oxygenated alicyclic compounds, some of which are new, as perfuming and/or flavouring ingredients in the manufacture of perfumes and perfumed products and/or in the preparation of artificial flavours for foodstuffs, animal feeds, beverages, pharmaceutical preparations and tobacco products.

Process for the preparation of said alicyclic compounds.

3 Claims, No Drawings

BUTENOYL-CYCLOHEXANONES

This is a division of application Ser. No. 408,919 filed Oct. 23, 1973.

SUMMARY OF THE INVENTION

The invention relates to the use as perfuming and/or flavouring ingredients of oxygenated alicyclic compounds of formula

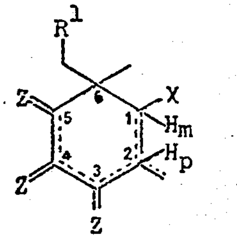

I wherein the symbol $F^1$ represents an alkyl radical containing from 1 to 6 carbon atoms or a hydrogen atom, the symbol X represents a univalent radical of formula

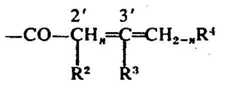

containing a double bond in one of the positions indicated by the dotted lines and wherein the index n represents the integers zero or 1, and each of the symbols $R^2$, $R^3$ and $R^4$ represents a hydrogen atom or one of them represents an alkyl radical containing from 1 to 6 carbon atoms and each of the others is a hydrogen atom, or of formula

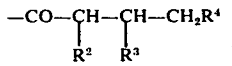

wherein the symbols $R^2$, $R^3$ and $R^4$ have the same meaning as indicated above, and wherein:

A. the six membered ring possesses either a single or an isolated or two conjugated double bonds in the positions indicated by the dotted lines;

the indexes *m* and *p* represent the integers zero or 1;

one of the symbols Z represents an oxygen atom and each of the others represents one or two hydrogen atoms; or B. the six membered ring possesses a double bond at position 1;

*m* and *p* are identical and equal to zero;

the symbol Z at position 4 represents a hydroxyl group and a hydrogen atom and each of the others represents two hydrogen atoms.

The invention also relates to new oxygenated alicyclic compounds of formula

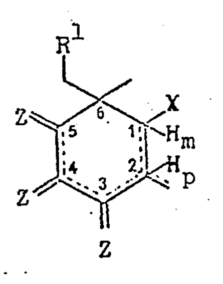

I' wherein the symbols $R^1$, X and Z, the indexes *m* and *p*, and the cyclic dotted lines have the same meaning as indicated above for formula I, letter A.

The invention finally relates to a process for the preparation of a compound of formula I, which comprises A. treating a compound of formula

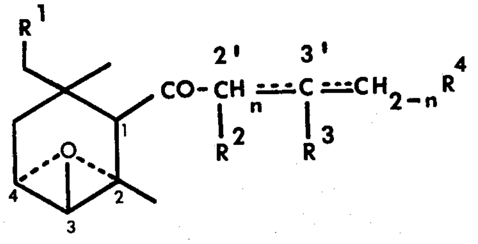

II wherein the epoxy ring is bound to positions 2 and 3 or 3 and 4 of the ring and wherein the side chain contains a double bond at position 2' or 3' as indicated by the dotted lines, the index n represents the integers zero or 1, the symbols $R^1$ represents an alkyl radical containing from 1 to 6 carbon atoms or a hydrogen atom, each of the symbols $R^2$, $R^3$ and $R^4$ represents a hydrogen atom or one of them represents an alkyl radical containing from 1 to 6 carbon atoms and each of the others represents a hydrogen atom, by means of an acidic isomerizing agent, to afford a compound of formula

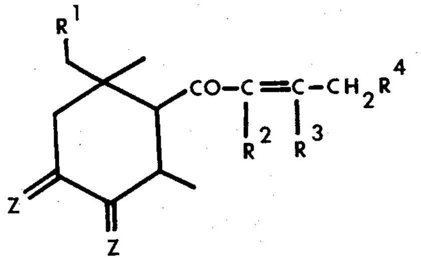

Ia wherein one of the symbols Z represents an oxygen atom and the other two hydrogen atoms and wherein the symbols $R^1$, $R^2$, $R^3$ and $R^4$ have the same meaning as indicated above; or B. oxydizing a compound of formula

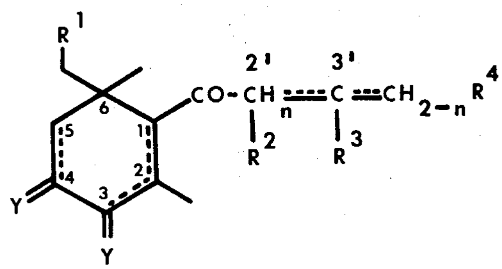

III possessing a single or a double bond in the ring at positions indicated by the dotted lines and wherein one of the symbols Y represents:

a hydroxyl group or a halogen, and a hydrogen atom, or two hydrogen atoms, and the other represents 1 or 2 hydrogen atoms, and wherein the symbols $R^1$, $R^2$, $R^3$ and $R^4$, the position of the double bond of the side chain and the index n are defined as under letter A, to afford a compound of formula

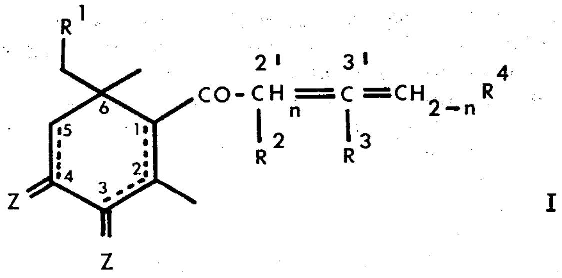

Ib wherein one of the symbols Z represents an oxygen atom and the other represents 1 or 2 hydrogen atoms, and wherein the symbols $R^1$, $R^2$, $R^3$ and $R^4$, the position of the cyclic double bond and of the double bond of the side chain and the index n are defined as indicated above; or C. oxydizing a compound of formula

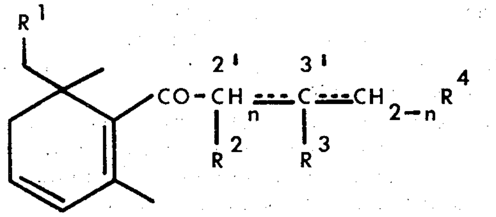

IV wherein the symbols $R^1$, $R^2$, $R^3$ and $R^4$, the position of the double bond of the side chain and the index n are defined as under letter B, to afford a compound of formula

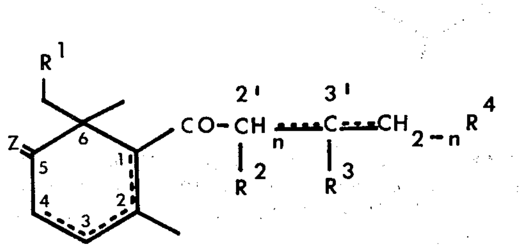

Ic containing two conjugated cyclic double bonds at position 1 and 3, wherein the symbol Z represents an oxygen atom and wherein the symbols $R^1$, $R^2$, $R^3$ and $R^4$, the position of the double bond of the side chain and the index n are defined as indicated above; or D. reducing the keto compound obtained according to the process under letter C to afford a compound of formula

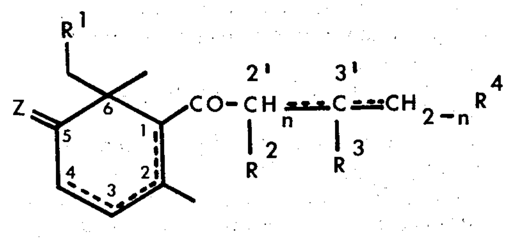

Id possessing a cyclic double bond at position 1 and a double bond at position 2′ of the side chain, wherein the index n is equal to zero and wherein the symbols Z, $R^1$, $R^2$, $R^3$ and $R^4$ have the same meaning as indicated for formula Ic; or a compound of formula

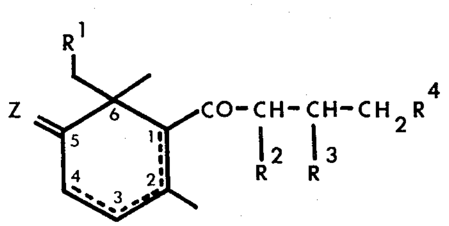

Ie in which the ring either is saturated or contains an isolated double bond or two conjugated double bonds in the positions indicated by the dotted lines and wherein the symbols Z, $R^1$, $R^2$, $R^3$ and $R^4$ are defined as indicated above.

BACKGROUND OF THE INVENTION

One of the main objects of the aromatization of foodstuffs for instance is to restore the original quality and nature of the flavor, aroma and taste of a given foodstuff material. Very often in fact the organoleptic properties of foodstuffs particularly diminish or are somehow modified in the course of the processes of freezing and storage, or during the modifications, such as cooking or baking, to which the foodstuffs are subjected in order to yield an edible material.

In the past the aromatization was mainly achieved by using materials of natural origin. Nowadays, however, synthetic chemical compounds are used at an ever increasing rate. Said compounds possess the advantage of being available very often in unlimited quantities and at prices lower than those of the natural materials. Moreover, due to the fact that the flavouring character of a natural material is the result of the overall effect determined by the combination and interaction of each of its constituents, the effects achieved by said natural material are very often not as well reproducible as those obtained by the use of the pure synthetic compounds.

In the field of perfumery the man in the art has to solve a similar problem in attempting to reconstitute the olfactive notes of certain natural essential oils or extracts. The perfumer's creativity however is continually boosted by the finding of new synthetic compounds, the organoleptic properties of which will enable him to introduce unprecedented olfactive characters or nuances into new phantasy perfume compositions.

As a consequence, the problem that the chemical industry has to solve is to satisfy the increasing demand of organoleptically interesting chemicals in order to better suit the specific needs of flavourists and perfumers.

Whereas 2,6,6-trimetyl-1-(but-1-en-3-oyl)-cyclohex-1-en-3-one, a diketo compound of formula

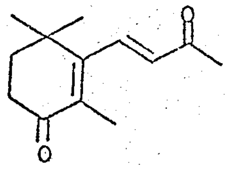

is known as possessing the typical odour of ionones, reminiscent more particularly of that of violets [see Agr. Biol. Chem. 35, 962 (1971)], we have suprisingly found that 2,6,6-trimethyl-1-(but-2-enoyl)-cyclohex-1-en-3-one, a diketo compound of formula

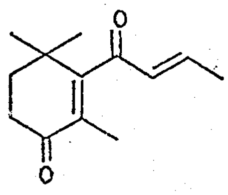

possesses an original sweet and fruity odour, reminiscent more precisely of that of pears or apples for example. This particular odour is moreover clearly different from that of the corresponding monoketo derivative, namely 2,6,6-trimethyl-1-(but-2-enoyl)-cyclohex-1-ene, known in the art as "β-damascone", this latter compound possessing a characteristic fruity, minty and slightly harsh odour [see Helv. Chim. Acta 54, 531 (1970)].

Equally different from the odour of β-damascone is the odour of 2,6,6-trimethyl-1-(but-2-enoyl)-cyclohex-1-en-4-ol, a compound of formula

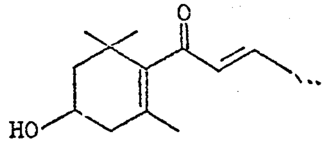

which develops an original and tenacious fruity and flowery odoriferous note.

Although the odour of the above mentioned compounds of the invention is reminiscent, in some instances, of that of known alicyclic ketones [see e.g. Belgian Patent No. 750049], their olfactory properties are definitely different when the compounds of the invention are used as perfuming ingredients in a perfume composition. This characteristic olfactory effect is well marked in a fruity or a floral perfume composition for example. Whereas β-damascone is particularly appreciated in the art for the reconstruction of the "top-notes" in a synthetic rose oil for example, both 2,6,6-trimethyl-1-(but-2-enoyl)-cyclohex-1-en-3-one and 2,6,6-trimethyl-1-(but-2-enoyl)-cyclohex-1-en-4-ol typically enhance the "background notes" of the said oil, conferring to the thus reconstituted oil an unprecedented harmonious olfactive character.

PREFERRED EMBODIMENT OF THE INVENTION

We have found that the oxygenated alicyclic compounds of formula I possess unique organoleptic properties and represent very useful ingredients for the preparation of perfumes or perfumed products as well as for the reconstruction of essential oils. We have equally found that the said compounds are particularly useful in the preparation of various artificial flavours and for flavouring foodstuffs, animals feeds, beverages, pharmaceutical preparations and tobacco products.

In the field of perfumery for example, the compounds of formula I develop a pleasant and original sweet and slightly fruity odour, reminiscent in some instances of that of pears, apples, mandarines or even apricots. The said compounds can also improve, enhance or modify various olfactive notes, e.g. woody, flowery, herbal or even leatherlike notes. The use of the above compounds is therefore very useful in fine perfumery as well as for the manufacture of perfumed products as e.g. soaps, detergents, waxes, household materials or cosmetic preparations.

When the compounds of formula I are used as perfuming ingredients in perfume compositions unique effects are achieved by the use of proportions comprised between about 0.5 and about 5% of the total weight of the perfume composition. Depending upon the desired effect or upon the nature of the other constituents of a given composition, concentrations as low as 0.01% or as high as from about 10 to 20% (parts by weight), can be used. When the said compounds are used as reinforcing ingredients in perfumed bases, the concentrations used can be as high as about 80% of the total weight of the said base.

The compounds of formula I are also appreciated in the flavour industry. Depending upon the nature of the products in which they are incorporated, the said compounds develop a sweet and fruity, slightly flowery and woody gustative note, reminiscent in some instances of that of honey. The compounds of formula I may also improve, enhance or modify various gustative notes such as herbal, winey, green, woody or waxy notes for examples, or any combination of the said notes.

Depending upon the nature of the flavoured material or upon the desired effect, the proportions used can vary within wide limits, being of the order of 1 ppm to 1% of the total weight of the flavoured material. Useful effects can be achieved by the use of proportions comprised between about 50 and about 100 ppm of the total weight of the flavoured product.

When the said compounds are used as ingredients for the preparation of artificial flavours, they can be used in proportions comprised between about 0.1 and about 15% of the total weight of the said flavouring composition, the proportions preferably used being of the order of 1 to 10%.

It is to be understood that the limits of the proportions given above do not represent absolute limits; in certain cases, where special organoleptic effects are desired, the compounds of the invention may be used in higher or lower concentrations than those mentioned above. The term "foodstuff" is used in this specification in its broadest sense. It also comprises products such as coffee, tea or chocolate.

Among the compounds of formula I which can be used according to the present invention, only two of them are known compounds, namely 2,6,6-trimethyl-1-(but-2-enoyl)-cyclohex-1-en-4-ol and 2,6,6-trimethyl-1-butyryl-cyclohex-1-en-4-ol [see Agr. Biol. Chem. 36, 168 (1972)].

2,6,6-Trimethyl-1-(but-2-enoyl)-cyclohex-1-en-4-ol may be prepared from an alicyclic triol according to the method illustrated hereinafter. This method consists in converting an acetylenic triol into the desired keto-alcohol according to the following reaction scheme:

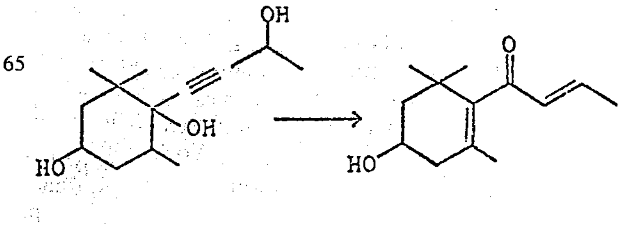

The said acetylenic -enoyl)-cyclohex-is converted into the desired hydroxy-ketone by means of an acidic dehydrating agent such as a strong mineral or organic acid. Sulfuric acid is the preferred one. The preparation of the above mentioned compounds is given hereinbelow:

2,6,6

-Trimethyl-1-(but-2-enoyl)-cycloxex-1-en-4-ol a mixture of 16 g of 2,6,6-trimethyl-1-(3-hydroxybutynyl)-cyclohexan-1,4-diol [prepared according to the method described in J. Chem. Soc. 1971, 404] and 160 ml of a 30% aqueous solution of $H_2SO_4$ was stirred at room temperature for 10 hours. The reaction mixture was then extracted with ether and the organic layer was washed, dried and evaporated according to the usual techniques. The distillation (ca. 120°C/0.02 Torr) of the obtained residue finally gave 12 g of an oily material containing 75% of the desired compound. The pure compound, obtained by means of a preparative vapour phase chromatography, was identical with that described in Agr. Biol. Chem., op. cit.

$n_D^{20}$= 1.5129; $d_4^{20}$ = 1.028

MS : $M^+$= 208 (25); m/e: 193 (30), 175 (41); 149 (17); 140 (18); 121 (49); 105 (20); 93 (15); 79 (16); 55 (28); 49 (100).

2,6,6-Trimethyl-1-butyryl-cyclohex-1-en-4-ol

This compound was obtained by reducing the above corresponding unsaturated derivative, by means of $LiAlH_4$.

$n_D^{20}$ = 1.4949; $d_4^{20}$ = 0.9986

MS : $M^+$ = 210 (2); m/e: 177 (3); 167 (100); 149 (5); 139 (2); 121 (32); 105 (5); 93 (15).

Among the compounds of formula I which can be used according to the present invention, the following new compounds possess particularly valuable organoleptic properties:

2,6,6-trimethyl-1-butyryl-cyclohexan-3-one,
2,6,6-trimethyl-1-(but-2-enoyl)-cyclohexan-3one,
2,6,6-trimethyl-1-(but-2-enoyl)-cyclohex-1-en-3-one,
2,6,6-trimethyl-1-(but-2-enoyl)-cyclohexan-4-one,
2,6,6-trimethyl-1-(but-2-enoyl)-cyclohex-2-en-4-one,
2,6,6-trimethyl-1-butyryl-cyclohexan-5-one,
2,6,6-trimethyl-1-butyryl-cyclohex-1-en-5-one,
2,6,6-trimethyl-1-butyryl-cyclohex-2-en-5-one,
2,6,6-timethyl-1-butyryl-cyclohex-3en-5-one,
2,6,6-trimethyl-1-butyryl-cyclohexa-1,3-dien-5-one,
2,6,6-trimethyl-1-(but-2-enoyl)-cyclohex-1-en-5-one, and
2,6,6-trimethyl-1-(but-2enoyl)-cyclohexa-1,3-dien-5-one.

According to a further subject matter of the present invention, epoxy compounds of formula II are converted into the corresponding, diketo derivatives by means of a treatment with an acidic isomerizing agent.

Suitable isomerizing agents are mineral acids such as e.g. sulfuric or phosphoric acid, or Lewis acids such as $BF_3$ or $MgBr_2$ for example, these latter reagents being used in the presence of a solvent such as e.g. ethyl ether or benzene [see H. O. House, Modern Synthetic Reactions, W. A. Benjamin Inc., New York, 1965, p.

122–3]. An acidic diatomaceous earth in the presence of an inert organic solvent may also be used. Suitable solvents are benzene, dioxane, tetrahydrofurane or ethyl acetate for example, or any mixture of at least two of the said solvents. The isomerization reaction is generally carried out at a temperature comprised between 50° C and the boiling point of the chosen solvent or mixture of solvents. However the given temperatures may vary within a broader range when particular reaction conditions are required.

According to a preferred embodiment of the process of the invention, the said isomerization is effected by heating the compound of formula II at a temperature near to 100°C, in the presence of an acidic diatomaceous earth and dioxane. Thus, 2,6,6-trimethyl-1-(but-2-enoyl)-cyclohexan-3-one is prepared from either 2,6,6-trimethyl-2,3-epoxy-1-(but-2-enoyl)cyclohexan or 2,6,6-trimethyl-2,3-epoxy-1-(but-3-enoyl)-cyclohexane.

The compounds of formula II used as starting material in the above process may be obtained by epoxidizing the corresponding cyclohexenic derivatives according to the usual techniques.

As indicated above compounds of formula III are converted into keto derivatives Ib by means of an oxidation. Said oxidation may be carried out by means of the reactants commonly used in order to convert a hydroxy group, a halogen or an activated methylene group into the corresponding carbonyl group. Suitable oxidation agents are oxygenated derivatives of a transition metal such as e.g. chromium, nickel or manganese. [see H. O. House, op. cit., p. 718]. $CrO_3$ or $MnO_2$, or a chromate or a permanganate of an alkali metal, used in the presence of a mineral acid such as sulfuric acid for example are the preferred reagents.

$CrO_3$ in the presence of an organic base such as pyridine may also be advantageously used as well as a compound such as ter-butyl chromate [see J.Org. Chem. 34, 3587 (1969) and Agr. Biol. Chem. 35, 962 (1971)].

Thus, according to a preferred embodiment of the process of the invention, 2,6,6-trimethyl-1-(but-2-enoyl)-cyclohex-1-en-3-one may be obtained from 3-bromo-2,6,6-trimethyl-1-(but-2-enoyl)-cyclohex-1-ene, by means of an oxidation with $CrO_3$ in the presence of sulfuric acid. In an analogous way, 2,6,6-trimethyl-1-(but-2-enoyl)-cyclohexan-4-ol and 2,6,6-trimethyl-1-(but-2-enoyl)-cyclohex-2-ene were converted into 2,6,6-trimethyl-1-(but-2-enoyl)-cyclohexan-4-one and 2,6,6-trimethyl-1-(but-2-enoyl)-cyclohex-2-en-4-one, respectively.

The compounds of formula III used as starting material in the above process may be obtained in accordance with known methods [see for example French Patent No. 1 591 031].

Compounds of formula IV may also be converted into the desired keto compounds by means of an oxidation. The said oxidation may be carried out by means of the reagents mentioned above or by means of selenium dioxide, this latter reagent being the preferred one [see H. O. House, op. cit., 2nd edition, p. 407–411].

2,6,6-Trimethyl-1-(but-2-enoyl)-cyclohexa-1,3-diene is thus easily converted into 2,6,6-trimethyl-1-(but-2-enoyl)-cyclohexa-1,3-dien-5-one. The cyclohexadiene derivative of formula IV may be prepared in accordance with the method described in Helv. Chim. Acta 54, 1899 (1971).

Finally, compounds of formula Ic may be converted into compounds Id and/or Ie by means of a reduction. The said reduction is effected by means of a catalytic hydrogenation in the presence of Raney nickel, platinum oxide or palladium on charcoal, for example. Raney nickel, used in the presence of an inert solvent such as e.g. ethyl alcohol, is the preferred hydrogenation catalyst.

According to a preferred embodiment of the process of the invention, the catalytic hydrogenation of 2,6,6-trimethyl-1-(but-2-enoyl)-cyclohexa-1,3-dien-5-one yields a mixture comprising 2,6,6-trimethyl-1-butyryl-cyclohexan-5-one, 2,6,6-trimethyl-1-butyryl-cyclohex-1-en-5-one, 2,6,6-trimethyl-1-butyryl-cyclohex-2-en-5-one, 2,6,6-trimethyl-1-butyryl-cyclohex-3-en-5-one, 2,6,6-trimethyl-1-butyryl-cyclohexa-1,3-dien-5-one and 2,6,6-trimethyl-1-(but-2-enoyl)-cyclohex-1-en-5-one.

Each of the above compounds may be obtained in a pure state by separating the thus obtained mixture by means of a preparative vapour phase chromatography.

The preparations and utilization of the compounds of this invention are illustrated in a more detailed way by the following specific examples wherein the temperatures are given in degrees centigrade. The other compounds included within this invention can be prepared in the same or similar manner and possess similar organoleptic properties.

EXAMPLE 1

2,6,6-Trimethyl-1-(but-2-enoyl)-cyclohexan-3-one 5.0 g (24 mMole) of 2,6,6-trimethyl-2,3-epoxy-1-(but-2-enoyl)-cyclohexane dissolved in 50 ml of dioxane were heated to reflux under a nitrogen atmosphere, in the presence of 1.0 g of acidic diatomaceous earth. After 2 hours of heating, the vapour phase chromatography analysis showed a total disappearance of the starting material. The reaction mixture was then cooled and filtered on CELITE. After elimination of the volatile fractions and distillation of the obtained residue there were thus isolated 4.6 g of a semicristalline, product, b.p. 60°–90°/0.1 Torr.

Pure 2,6,6-trimethyl-1-(but-2-enoyl)-cyclohexan-3-one was finally obtained after cristallization of the crude material in petroleum ether (b.p. 40°–60°): 3.0 g (60 %), m.p. 76°–77°.

IR (KBr) : 1710, 1675, 965 $cm^{-1}$
NMR ($CCl_4$): 0.76 (3H, d, J=4 cps); 1.04 (3H, s); 1.14 (3H, s); 1.94 (3H, d, J=7 cps); 6.0–7.15 (2H, m) δ ppm
MS : $M^+$ = 208 (8); m/e = 152 (1); 139 (18); 124 (1); 111 (23); 97 (15); 83 (4); 69 (100); 55 (22).

When 2,6,6-trimethyl-2,3-epoxy-1-(but-3-enoyl)-cyclohexane was used as starting material in the above process, the desired ketone was obtained with an analogous yield.

The 2,6,6-trimethyl-2,3-epoxy-1-(but-2-enoyl)-cyclohexane used as starting material in the above process, may be prepared according to the following procedure: to a cold mixture (0°) of 14.2 g (74 mMole) of 2,6,6-trimethyl-1-(but-2-enoyl)-cyclohex-1-ene [prepared according to the method given in Helv. Chim. Acta 53, 541 (1970)] and 7.0 g (85 mMole) of anhydrous sodium acetate in 150 ml of $CH_2Cl_2$, there were added a mixture of 13.3 g (ca. 60mMole of peracetic acid (40% in $CH_3COOH$) and 0.3 g of sodium acetate. The reactants were added dropwise, under vigourous stirring, in order to maintain the temperature of the reaction mixture between 0° and 10°. After the said addition the reaction mixture was stirred overnight at room temperature, then diluted with 200 ml of water. After having been successively washed with water, 2N $NaHCO_3$ and water, the organic layer was dried over $MgSO_4$ and evaporated to dryness to afford 14.2 g of a practically pure epoxide b.p. 78°/0.01 Torr, $n_D^{20}$ = 1.4901.

IR (neat): 1670, 1620, 965 $cm^{-1}$
NMR ($CCl_4$): 0.89 (6H, 2s); 1.23 (3H, s); 1.85 (3H, d, J=6 cps); 2.85 (1H, m); 6.2–7.0 (2H, m) δ ppm
MS : $M^+$ = 208 (1); m/e = 193 (2); 175 (1); 152 (2); 137 (13); 123 (10); 107 (37); 97 (7); 81 (7); 69 (100); 55 (11).

2,6,6-Trimethyl-2,3-epoxy-1-(but-2-enoyl)-cyclohexane was obtained according to the same procedure from the corresponding cyclohexene derivative [see Helv. Chim. Acta 53, 541 (1970)], b.p. 78°–80°/0.01 Torr.

IR (neat) : 3050, 1820, 1715, 1635, 990, 910 $cm^{-1}$
NMR ($CCl_4$) : 0.86 (3H, d); 0.96 (3H,s); 1.36 (3H,s); 3.22 (1H, broad s); 4.86–6.2 (3H,m) δ ppm
MS : $M^+$ = 208 (0.1); m/e = 167 (17); 149 (4); 140 (11); 123 (42); 111 (33); 95 (25); 84 (50); 69 (78).

EXAMPLE 2

2,6,6-Trimethyl-1-(but-2-enoyl)-cyclohexan-4-one

A mixture of 11.0 g (37 mMole) of $Na_2Cr_2O_7.2H_2O$, 5 ml of acetic acid, 3.5 g of concentrated $H_2SO_4$ and 41 ml of water was added at room temperature and under vigourous stirring to a solution of 7.0 g (33 mMole) of 2,6,6-trimethyl-1-(but-2-enoyl)-cyclohexan-4-ol in 20 ml of benzene. The mixture was further stirred for one hour and finally diluted with water. The organic layer was then submitted to the usual treatments of washing and drying, and evaporated to dryness to afford 6.0 g (87 %) of a crude keto compound. An analytical sample was purified by cristallization in hexane, m.p. 83°–85°.

IR (KBr) : 1710, 1680, 1650, 1620, 962 $cm^{-1}$
NMR ($CCl_4$): 0.92 (3H, s); 0.98 (3H,s); 0.93 (3H,d, J=6 cps); 1.93 (3H, d, J=7 cps); 6.0–7.1 (2H, m) δ ppm
MS : $M^+$ = 208 (8); m/e: 193 (10); 166 (3); 151 (14); 137 (4); 125 (26); 111 (8); 95 (3); 83 (23); 69 (100); 55 (18).

EXAMPLE 3

2,6,6-Trimethyl-1-(but-2-enoyl)-cyclohex-1-en-3-one a. 3-bromo-2,6,6-trimethyl-1-(but-2-enoyl)-cyclohex-1-ene:

A mixture of 110.5 g (620 mMole) of N-Bromosuccinimide and 120 mg of α,α'-azo-diisobutyronitrile was added to 86.5 g (4.50 mMole) of 2,6,6-trimethyl-1-(but-2-enoyl)-cyclohex-1-ene dissolved in a mixture of 700 ml of $CH_2Cl_2$ and 350 ml of benzene. The reaction mixture was then stirred and heated at 50° until complete disappearance of the bromination agent. After having been cooled at 5° the reaction mixture was then filtered and concentrated under reduced pressure to afford 125 g of crude bromo derivative. This latter compound was used without any further purification for the subsequent reaction step.

b. 125 g of crude 3-bromo-2,6,6-trimethyl-1-(but-2-enoyl)-cyclohex-1-ene [prepared under letter a] were added dropwise to a mixture of 100 g (1 Mole) $CrO_3$, 100 ml acetic acid and 100 ml of water, kept at 20°–25°. After addition of the reactants the reaction mixture was heated under stirring at 40° for 30 min., and finally diluted with 1 l of water. After neutralization of the reactin mixture by means of a 10 % aqueous solution of NaOH, the obtained mixture was submitted to a steam distillation. 3 l of the thus obtained distillate were then extracted with ether (3 × 500 ml), the organic layer was washed with water, dryed over $Na_2SO_4$ and finally concentrated under reduced pressure. There were thus obtained 68.2 g (73 %) of a semi-cristalline product, b.p. 71°–116°/0.01 Torr, which was finally cristallized in hexane to afford 51.3 g (55 %) of pure 2,6,6-trimethyl-1-(but-2-enoyl)-cyclohex-1-en-3-one, m.p. 68°–69°.

IR ($CCl_4$) : 1680, 1660, 1235, 970 $cm^{-1}$
NMR ($CCl_4$) : 1.18 (6H, s); 1.54 (3H, s); 2.0 (3H, d of d, J=6, J'=1,5 cps); 2.0 (2H, q, J=6 cps); 2,34 (2H, q, J=6 cps); 6.0–7.0 (2H, m) δ ppm
MS : $M^+$ = 206; m/e = 191, 163, 150, 138, 121, 109, 91, 79, 69, 55.

The 2,6,6-trimethyl-1-(but-2-enoyl)-cyclohex-1-ene used as starting material in the above process may be prepared in accordance with the method described in French Patent No. 1 591 031.

EXAMPLE 4

2,6,6-Trimethyl-1-(but-2-enoyl)-cyclohex-2-en-4-one 10 ml of acetic anhydride were first added to a solution kept at 10° of 3.5 g of $Na_2Cr_2O_7.2H_2O$ in 10 ml of acetic acid and the obtained mixture was stirred for one hour. A solution of 2.1 g of 2,6,6-trimethyl-1-(but-2-enoyl)-cyclohex-2-ene [prepared according to the method described in Helv. Chim. Acta 53, 541 (1970)], in 10 ml of acetic anhydride was then added to the above mixture. After having been stirred overnight at room temperature, the reaction mixture was then poured onto crushed ice and extracted with ether. After the usual treatments of washing, drying and evaporation, there was obtained 2.0 g of crude material containing 80 % of the desired keto compound.

An analytical sample was obtained by purification by vapour phase chromatography, m.p. 43°–44°.

IR (neat) : 1685, 1670, 1625, 970, 825 $cm^{-1}$
NMR ($CCl_4$) : 0.96 and 1.06 (6H, 2s); 1.94 (3H, d of d, J=7, J'=2 cps); 2.54 (2H, d, J=16 cps); 3.32 (1H, s); 5.84 (1H, m); 6.22 and 6.95 (2H, d of m and d of d, J=16, J'=14, J''=6 cps) δ ppm
MS : $M^+$ = 206 (1); m/e: 191 (0.1); 178 (0.1); 154 (2); 138 (20); 123 (21); 109 (1); 96 (1); 79 (1); 69 (100); 56 (15).

EXAMPLE 5

2,6,6-Trimethyl-1-(but-2-enoyl)-cyclohexa-1,3-dien-5-one 2.5 g (13 mMole) of 2,6,6-trimethyl-1-(but-2-enoyl)-cyclohexa-1,3-dien [prepared according to the method given in Helv. Chim. Acta 54, 1899 (1971)] dissolved in 50 ml of dioxane were heated, under nitrogen atmosphere, during 45 min. at 60°, in the presence of 1.8 g (16 mMole) of selenium oxide. The reaction mixture was then cooled, concentrated under reduced pressure, and the obtained residue, diluted with 50 ml of acetic acid, was finally stirred at room temperature for 2 hours in the presence of 6 g of Raney nickel. The reaction mixture was then filtered, evaporated to dryness and the obtained residue was distilled (b.p. 100°–110°/0.2 Torr) to afford 2.4 g of a material containing 80 % of the desired keto compound.

A pure sample was obtained by cristallization in hexane, m.p. 66°–67°.

IR (neat) : 1665, 1640, 970 $cm^{-1}$
NMR ($CCl_4$) : 1.18 (6H, 2s); 1.81 (3H, s); 1.95 (3H, d, J=7 cps); 5.9 (1H, d, J=10 cps); 6.2 (1H, m); 6.72 (1H, d, J=10 cps); 6.4–6.9 (1H, m) δ ppm
MN : $M^+$ = 204 (3); m/e = 136 (22); 107 (4); 91 (8); 69 (100); 41 (15).

EXAMPLE 6

Catalytic hydrogenation of 2,6,6-trimethyl-1-(but-2-enoyl)-cyclohexa-1,3-dien-5one 50 g (236 mMole) of the keto compound prepared according to Example 5, dissolved in 500 ml of ethanol were hydrogenated at room temperature in the presence of 1 g of Raney nickel. The reaction was stopped after absorption of 10,000 ml of $H_2$. The reaction mixture was then filtered, evaporated and then submitted to a fractional distillation by means of a spinning band column. The thus obtained material was finally separated by means of a preparative vapour phase chromatography and the following compounds were identified:

a. 2,6,6-trimethyl-1-butyryl-cyclohex-2-en-5-one

IR (neat) : 1700, 825 $cm^{-1}$
NMR ($CCl_4$) : 0.90 (3H, t, J=7 cps); 0.94 and 1.1 (6H, 2s); 1.8 (3H, broad s); 2.82 (2H, m); 3.08 (1H, s); 5.6 (1H, m) δ ppm
MS : $M^+$ = 208 (0.1); m/e = 137 (42); 119 (64); 109 (19); 95 (12); 82 (24); 71 (87); 55 (12); 43 (100); 27 (16).

b. 2,6,6-trimethyl-1-butyryl-cyclohex-1-en-5-one $n_D^{20} = 1.4837$ ; $d_4^{20} = 0.9988$ IR (neat) : 1715, 1695 $cm^{-1}$
NMR ($CCl_4$) : 0.94 (3H, t, J=5 cps); 1.16 (6H, 2s); 1.68 (3H, s); 2.45 (4H, m) δ ppm
MS : $M^+$ = 208 (10); m/e: 165 (66); 137 (100); 123 (82); 109 (17); 95 (42); 81 (12); 71 (35); 55 (23); 43 (67); 27 (23).

c. 2,6,6-trimethyl-1-butyryl-cyclohexa-1,3-dien-5one

IR (neat) : 1670, 1640, 1575 $cm^{-1}$
NMR ($CCl_4$) : 0.95 (3H, t, J=6 cps); 1.21 (6H, 2s); 1.85 (3H, s); 5.91 (1H, d, J=10 cps); 6.72 (1H, d, J=10 cps) δ ppm
MS : $M^+$ = 206 (0.1); m/e = 136 (100); 121 (10); 109 (18); 91 (19); 79 (6); 71 (26); 43 (41).

d. 2,6,6-trimethyl-1-butyryl-cyclohexan-5-one $n_D^{20} = 1.4732$; $d_4^{20} = 0.9874$ IR (neat): 1710 $cm^{-1}$
NMR ($CCl_4$): 0.95 (3H, t, J=6 cps); 0.87 and 1.2 (6H, 2s); 2.78 (1H, m) δ ppm
MS: $M^+$ = 210 (20); m/e = 167 (20); 139 (45); 127 (33); 111 (2); 97 (70); 83 (70); 71 (85); 55 (68); 43 (100).

e. 2,6,6-trimethyl-1-(but-2-enoyl)-cyclohex-1-en-5-one
m.p. 70–71°

IR (neat): 1710, 1670, 1640, 1610, 965 $cm^{-1}$.
NMR ($CCl_4$)- 1.09 (6H, 2s); 1.62 (3H, s); 1.9 (3H, d, J=6 cps); 2.48 (4H, m); 6.05 (1H, m); 6.6 (1H, m) δ ppm
MS: $M^+$=206 (12); m/e=191 (10); 178 (8); 164 (65); 149 (63); 137 (33); 121 (60); 109 (15); 81 (10); 79 (14); 69 (100); 55 (20); 41 (73).

f. 2,6,6-trimethyl-1-butyryl-cyclohex-3-en-5-one

IR (neat): 1710, 1680 $cm^{-1}$
NMR ($CCl_4$): 0.88 (3H, t, J=7 cps); 0.98 and 1.12 (6H, 2s); 1.1 (3H, d, J=6 cps); 5.75 (1H, d, J=11 cps); 6.26 (1H, d, J=11 cps) δ ppm
MS: =208 (7); m/e=137 (12); 123 (19); 109 (13); 82 (100); 69 (19); 59 (9); 43 (34).

g. 2,6,6-trimethyl-1-butyryl-cyclohex-1-en-5-ol

IR (neat): 3450, 1690 $cm^{-1}$
NMR ($CCl_4$): 0.96 (3H, t, J=7 cps); 1.03 and 1.06 (6H, 2s); 1.54 (3H, s); 3.4 (1H, t, J=5 cps) δ ppm
MS: $M^+$= 210 (5); m/e = 167 (100); 149 (28); 139 (25); 121 (61); 105 (13); 93 (34); 79 (18); 71 (34); 55 (25); 43 (77).

EXAMPLE 7

A base perfume composition for a deodorizing perfume was prepared by admixing the following ingredients (parts by weight):

| | |
|---|---|
| α-Ionone | 50 |
| Civettone 10 %* | 30 |
| Synthetic jasmine | 100 |
| Synthetic rose | 100 |
| Levorotatory 4-methyl-2-(2-methyl-propen-2-yl)-tetrahydropyrane 10 %* | 10 |
| Heliotropin | 50 |
| Undecenal 10 %* | 10 |
| Decanal 10 %* | 20 |
| Octanal 10 %* | 20 |
| α-Phenylethyl acetate | 20 |
| Benzyl propionate | 20 |
| Petitgrain bigarade | 50 |
| Nerol | 100 |
| Phenylethyl propionate | 20 |
| p-Hydroxyphenylbutan-3-one | 10 |
| Linalol | 70 |
| Linalyl acetate | 50 |
| Ylang | 20 |
| Geranyl acetate | 70 |
| Citronellyl acetate | 60 |
| Citronellyl acetate | 60 |
| cis-Hex-2-enyl acetate | 20 |
| Diethyl phthalate | 100 |
| Total | 1000 |

*in diethyl phthalate

By adding 10 g of 2,6,6-trimethyl-1-(but-2-enoyl)-cyclohexan-3-one to 90 g of the above base composition, there was obtained a new perfume composition possessing a very harmonious and natural character. Moreover, the fruity note of the above perfume was particularly well enhanced and tenacious.

By replacing the above keto compound by 2,6,6-trimethyl-1-(but-2-enoyl)-cyclohex-1-en-3-one or by one of the alicyclic ketones described in the course of the present specification, analogous effects were observed. In some cases the olfactive effect was less pronounced.

EXAMPLE 8

A base perfume composition for a fine perfume was prepared by admixing the following ingredients (parts by weight):

| | |
|---|---|
| Absolute jasmine | 10 |
| Patchouli | 10 |
| Pimento oil (leaves) | 20 |
| Hydroxycitronellol | 50 |
| Synthetic rose | 100 |
| α-Isomethylionone | 100 |
| Synthetic jasmine | 150 |
| Vetiveryl acetate | 80 |
| Dodecanal 10 %* | 10 |
| Undecenal 10 %* | 80 |
| Decanal 10 %* | 20 |
| Nonanal 10 %* | 5 |
| Oriental sandalwood oil | 25 |
| Methyl 2-pentyl-3-oxo-cyclopentylacetate | 10 |
| Synthetic bergamot | 55 |
| Ylang extra | 20 |
| Natural degreased Civet 10 %* | 20 |
| Artemisia oil | 10 |
| Neroli bigarade | 5 |
| Synthetic violet 10 %* | 10 |
| Cyclopentadecanolide 10 %* | 100 |
| Coumarin | 10 |
| Heliotropin | 20 |
| Total | 920 |

*in diethyl phthalate.

By adding to 92 g of the above base composition 8 g of 2,6,6-trimethyl-1-(but-2-enoyl)-cyclohexan-3-one there was obtained a new perfume composition possessing a very harmonious and natural character. Moreover, the fruity note of the above perfume was particularly well enhanced and tenacious.

By replacing the above keto compound by 2,6,6-trimethyl-1-(but-2-enoyl)-cyclohex-1-en-3-one a similar effect was observed.

EXAMPLE 9

A base perfume composition for a flowery-type perfume was obtained by admixing the following ingredients (parts by weight):

| | |
|---|---|
| α-Ionone | 50 |
| Civettone 10 %* | 30 |
| Synthetic jasmine | 200 |
| Synthetic rose | 100 |
| Levorotatory 4-methyl-2-(2-methyl-prop-2-enyl)-tetrahydropyrane 10 %* | 10 |
| Heliotropin | 50 |
| Undecenal 10 %* | 15 |
| Decanal 10 %* | 10 |
| Octanal 10 %* | 5 |
| α-Phenylethyl acetate | 15 |
| Benzyl propionate | 20 |
| Petitgrain bigarade | 50 |
| Nerol | 20 |
| Phenylethyl propionate | 20 |
| p-Hydroxyphenylbutan-3-one 1 %* | 10 |
| Linalol | 70 |
| Linalyl acetate | 50 |
| Ylang | 20 |
| Geranyl acetate | 70 |
| Citronellyl acetate | 60 |
| cis-Hex-2-enyl acetate | 5 |
| Diethyl phthalate | 120 |
| Total | 1000 |

*in diethyl phthalate

By adding 10 g of 2,6,6-trimethyl-1-(but-2-enoyl)-cyclohex-1-en-4ol to 90 g of the above composition, there was obtained a new perfume composition possessing a very harmonious odour. The fruity-flowery note of the said perfume was moreover particularly well rounded

EXAMPLE 10

A base flavouring composition of the Tutti-Frutti type was prepared by admixing the following ingredients (parts by weight):

| | |
|---|---|
| Vanillin | 25 |
| Allyl caproate | 10 |
| Citral | 15 |
| Amyl butyrate | 35 |
| Sweet orange oil | 50 |
| Ethyl butyrate | 75 |
| Ethyl acetate | 150 |
| Amyl acetate | 150 |
| Lemon oil | 250 |
| Orange terpenes | 240 |
| Total | 1000 |

Two flavouring compositions were then prepared as indicated below (parts by weight):

| | A (test) | B(control) |
|---|---|---|
| Base composition | 100 | 100 |
| 2,6,6,-trimethyl-1-(but-2-enoyl)-cyclohex-1-en-3-one | 10 | — |
| 95 % Ethyl alcohol | 890 | 900 |
| Total | 1000 | 1000 |

Both mixtures A and B were then used for the preparation of the following foodstuffs, in the proportions of 100 g of flavouring compositions per 100 kg of foodstuff.

Ice-cream: An ice-cream mixture was prepared from 1 liter of milk, 5 egg yolks and 250 g of sugar in the following manner: the milk was heated, the sugar and the egg yolks were mixed and the hot milk was added to the mixture while stirring. Stirring was continued until the mass thickened, and the flavour was added. The mixture was then frozen in the usual manner.

Pudding: A mixture of 60 g of sugar and 3 g of pectine was added to 500 ml of hot milk, while stirring. The mixture was brought to the boil for a few seconds, the flavour was added and the mixture allowed to cool.

The foodstuffs prepared as described above were then tasted by a panel of flavour experts who declared that the "test" foodstuffs possessed a more pronounced, well rounded, fruity and slightly flowery taste as compared with the "control" foodstuffs, reminiscent of that of melon.

By replacing, in the same proportions, the above ketone by 2,6,6-trimethyl-1-(but-2-enoyl)-cyclohexan-3-one, an analogous effect was observed.

EXAMPLE 11

7 g of a 1 % ethanolic solution of 2,6,6-trimethyl-1-(but-2-enoyl)-cyclohex-1-en-3-one were sprayed onto 100 g of an "American blend"tobacco mixture. The tobacco thus flavoured was used for the manufacture of test cigarettes, the smoke of which was then subjected to organoleptic evaluation by comparison with unflavoured control cigarettes. The tobacco used to prepare the control cigarettes was preliminarily treated with a corresponding amount of ethyl alcohol.

A panel of flavour experts defined the taste of the smoke of the test cigarettes as being more rounded than that of the control cigarettes, the said smoke possessing moreover a more marked fruity and flowery character.

We claim:

1. Oxygenated Alicyclic compounds of formula

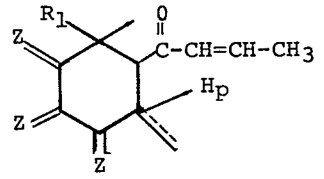

wherein the symbol $R_1$ represents an alkyl radical containing from 1 to 6 carbon atoms or a hydrogen atom the index P represents the integers zero or one and one of the symbols Z represents an oxygen atom and each of the other two represent two hydrogen atoms.

2. 2,6,6-Trimethyl-1-(but-2-enoyl)-cyclohexan-3-one.

3. 2,6,6-Trimethyl-1-(but-2-enoyl)-cyclohexan-4-one.

* * * * *

UNITED STATES PATENT AND TRADEMARK OFFICE

CERTIFICATE OF CORRECTION

PATENT NO. : 3,957,877

DATED : May 18, 1976

INVENTOR(S) : Karl-Heinrich Schulte-Elte, et al.

It is certified that error appears in the above-identified patent and that said Letters Patent are hereby corrected as shown below:

Column 1, line 22 "$F^1$" should be --$R^1$--

Column 7, line 1 "-enoyl)-cyclohex" should be --triol--

Column 7, line 9 "Trimethyl-1-(but-2-enoyl)-cycloxex-1-en-4-ol" Should be --Trimethyl-1-(but-2-enoyl)-cyclohex-1-en-4-ol--

Column 7, line 44 "-cyclohexan-3one" should be -- -cyclohexan-3-one--

Column 7, line 53 "-cyclohex-3en" should be -- -cyclohex-3-en--

Column 7, line 57 "-(but-2enoyl)" should be --(but-2-enoyl)--

Column 12, line 20 "MN" should be --MS--

Column 12, line 27 "5one" should be --5-one--

Column 12, line 59 "-dien-5one" should be -- -dien-5-one--

Column 13, line 15 "NMR($CCl_4$)-1.09" should be --

NMR($CCl_4$) : 1.09--

Column 13, line 28 "MS:=208" should be -- MS:$M^+$=208--

Column 13, line 61 "Citronellyl acetate" should only be listed once

UNITED STATES PATENT AND TRADEMARK OFFICE

CERTIFICATE OF CORRECTION

PATENT NO. : 3,957,877

DATED : May 18, 1976

INVENTOR(S) : Karl-Heinrich Schulte-Elte et al.

It is certified that error appears in the above-identified patent and that said Letters Patent are hereby corrected as shown below:

Column 15, line 2 "-en-4ol" should be -- -en-4-ol--

Column 16, line 16 "test" should be --"test"--

Column 16, line 18 "control" should be --"control"--

Column 16, line 19 "control" should be --"control"--

Column 16, line 22 "test" should be --"test"--

Column 16, line 23 "control" should be --"control"

Signed and Sealed this

Twenty-eighth Day of September 1976

[SEAL]

*Attest:*

RUTH C. MASON
*Attesting Officer*

C. MARSHALL DANN
*Commissioner of Patents and Trademarks*